US011127015B2

(12) United States Patent
Vandezande et al.

(10) Patent No.: US 11,127,015 B2
(45) Date of Patent: *Sep. 21, 2021

(54) METHODS AND APPARATUSES FOR FRAUD HANDLING

(71) Applicant: Sony Corporation, Tokyo (JP)

(72) Inventors: Bart Vandezande, Stuttgart (DE); Conor Aylward, Stuttgart (DE); Cristian Traum, Stuttgart (DE); Erbin Lim, Stuttgart (DE); Barbara Jochems, Stuttgart (DE); Olivier Elshocht, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/361,257

(22) Filed: Mar. 22, 2019

(65) Prior Publication Data
US 2019/0295091 A1  Sep. 26, 2019

(30) Foreign Application Priority Data

Mar. 26, 2018 (EP) ..................................... 18164058

(51) Int. Cl.
*G06Q 20/40* (2012.01)
*G06N 20/00* (2019.01)

(52) U.S. Cl.
CPC ....... *G06Q 20/4016* (2013.01); *G06Q 20/405* (2013.01); *G06Q 20/407* (2013.01)

(58) Field of Classification Search
CPC ........ G06Q 20/40; G06Q 40/00; G06Q 10/00; G06Q 20/38; G06Q 20/4016; H04L 9/00
See application file for complete search history.

(56) References Cited

U.S. PATENT DOCUMENTS

| | | | |
|---|---|---|---|
| 2005/0091524 A1* | 4/2005 | Abe ..................... | G06Q 20/341 726/26 |
| 2009/0222243 A1 | 9/2009 | Zoldi et al. | |
| 2010/0094767 A1 | 4/2010 | Miltonberger | |
| 2013/0013514 A1 | 1/2013 | Mackouse | |
| 2015/0212843 A1 | 7/2015 | Turgeman et al. | |
| 2016/0162895 A1* | 6/2016 | Nuzum ............ | G06Q 20/40145 705/44 |
| 2018/0005230 A1* | 1/2018 | Zovi ....................... | G06Q 20/02 |
| 2019/0005408 A1* | 1/2019 | Tolpin .................. | G06N 3/0454 |
| 2019/0164173 A1* | 5/2019 | Liu ......................... | G06N 20/00 |
| 2019/0295085 A1* | 9/2019 | Ashiya ............... | G06Q 20/3823 |
| 2020/0175518 A1* | 6/2020 | Chu ....................... | G06N 20/00 |

OTHER PUBLICATIONS

Richhariya et al., "An Approach to Detect Fraud at Account Level", International Journal of Engineering Trends and Technology (IJETT), vol. 31 No. 3, Jan. 2016, pp. 159-163.

* cited by examiner

*Primary Examiner* — Olabode Akintola
*Assistant Examiner* — Suckhwan Chon
(74) *Attorney, Agent, or Firm* — Xsensus LLP

(57) ABSTRACT

The present disclosure relates to a concept of fraud handling. A data transaction request is received via a data network from at least one user account. The data transaction request is analyzed based on predefined fraud detection rules to generate a fraud score associated with the at least one user account. The at least one user account is classified as fraudulent account if the associated fraud score exceeds a predefined fraud likelihood threshold. Data transactions associated with a classified fraudulent account via the data network are pseudo-randomly permitted or blocked.

7 Claims, 4 Drawing Sheets

METHODS AND APPARATUSES FOR FRAUD HANDLING

CROSS-REFERENCE TO RELATED APPLICATION

The present application claims priority to European Patent Application 18164058.2 filed by the European Patent Office on Mar. 26, 2018, the entire contents of which being incorporated herein by reference.

FIELD

The present disclosure relates to methods and apparatuses for handling fraudulent abuse of user accounts for data transactions, such as in data transactions related to e-commerce or the like.

BACKGROUND

In an increasingly connected world, both service providers, e.g. for e-commerce, and their users benefit from streamlined access and quick data transactions over data networks, such as the Internet. Prominent examples of such data transactions are online purchases of goods, software or services over e-commerce platforms. Unfortunately, the shift to digital communication and recordkeeping also gives fraudsters multiple entry points for abusing user accounts. A user account allows a user to authenticate to a service provider's system and potentially to receive authorization to access resources provided by or connected to that system. To log into an account, a user is typically required to authenticate oneself with a password or other credentials for the purposes of accounting, security, logging, and resource management, just to name a few examples. User accounts can be fraudulently (ab)used in various ways. For example, user credentials can be stolen and an account of a stolen user can be used for fraudulent purchases. For another example, fake user accounts of fake users can be set up for purchases with stolen credit cards. The fraud scenarios are manifold.

More and more online service providers need to react in real-time to offer the best possible user experience. For example, users should be able to setup new accounts or make digital purchases with no significant delay. This real-time requirement makes it easier for fraudulent user (fraudsters) to understand and reverse engineer how tools being used by the service providers detect fraudulent behavior work. Fraudsters can then better create strategies to bypass such fraud detection tools.

Hence, it is desired to make it more difficult for fraudsters to analyze and extract the behavior or patterns of fraud detection tools.

SUMMARY

This need is met by methods and apparatuses in accordance with the independent claims. Advantageous embodiments are addressed by the dependent claims.

According to a first aspect, the present disclosure provides a method of fraud handling. The method includes receiving a data transaction request from at least one user account via a data network, analyzing the data transaction request based on predefined fraud detection rules to generate a fraud score associated with the at least one user account, classifying the at least one user account as fraudulent account if the associated fraud score exceeds a predefined fraud likelihood threshold, and pseudo-randomly permitting or blocking data transactions associated with a classified fraudulent account via the data network.

According to a further aspect, the present disclosure provides an apparatus for fraud handling. The apparatus comprises a receiver which is configured to receive, via a data network, a data transaction request from at least one user account. The apparatus also comprises processor circuitry configured to analyze the data transaction request based on predefined fraud detection rules to generate a fraud score associated with the at least one user account, to classify the at least one user account as fraudulent account if the associated fraud score exceeds a predefined fraud likelihood threshold, and to pseudo-randomly permit or block data transactions associated with a classified fraudulent account via the data network.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
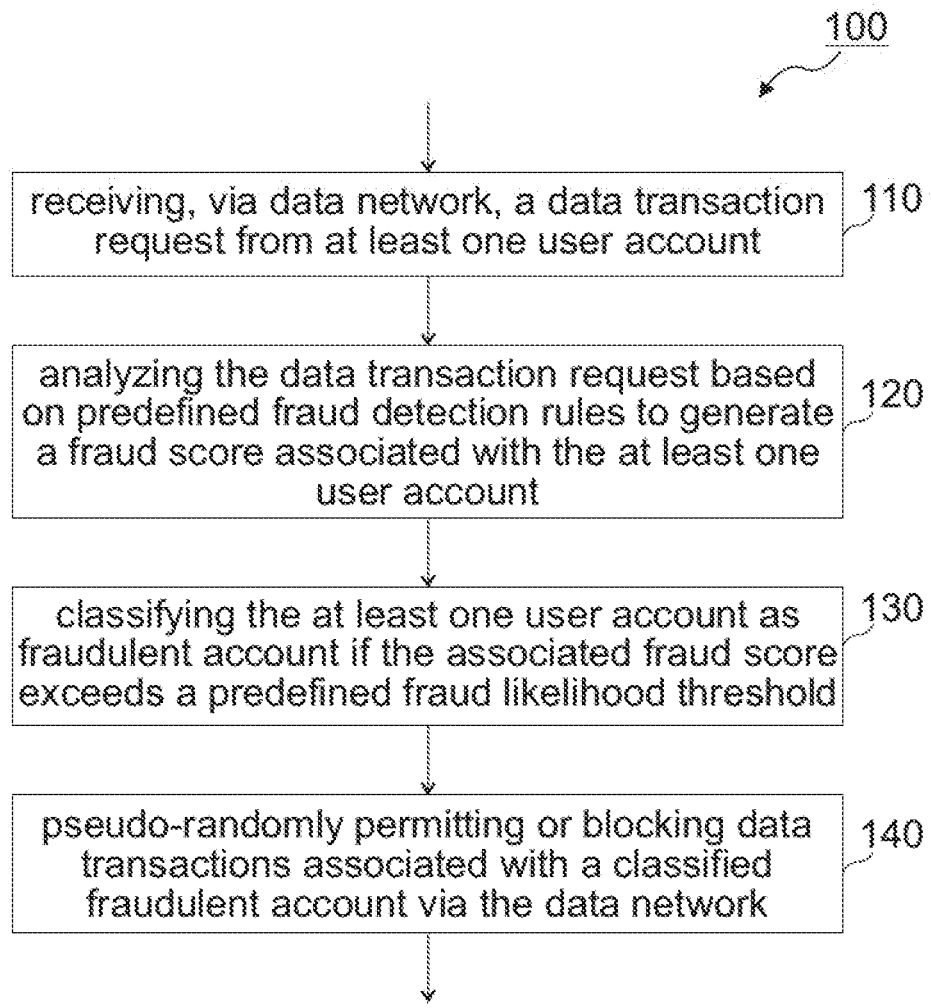
FIG. 1 shows a flowchart of a method of fraud detection according to an embodiment of the present disclosure.

Various examples will now be described more fully with reference to the accompanying drawings in which some examples are illustrated.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure.

Recently, online retail fraud attempts have grown drastically. While nothing can stop some criminals from fraudulent behavior, fraudsters can still be fought back. There are various fraud detection concepts, reaching from manual fraud detection policies to fully automated fraud detection, that can prevent e-commerce and/or e-banking fraud and secure online service providers and/or banks against revenue losses.

Various anti-fraud or fraud detection tools are based on a similar principle: a user sends a data transaction request, e.g. containing order details, to a service provider. A fraud detection mechanism screens the data transaction request for risk factors and returns an alert in the form of a risk score and/or an "approve/decline" response. To detect a possible financial fraud, multiple warning signs can be analyzed, e.g. different shipping and billing addresses, repetitive orders of the same item, big-ticket orders overseas, etc.

For example, more advanced fraud detection tools can be based on machine learning where real-time insights can be fed into machine learning models that can detect fraudulent behavior instantly. Compared to manual or human fraud detection reviews, machine learning can provide more speed and can embrace a wider range of online fraud signals. The skilled person having benefit from the present disclosure will appreciate, however, that various concepts and rules of fraud detection can be employed, reaching from purely manual concepts based on human judgement over semi-automated to fully automated approaches, such as machine learning. Thus, a fraud detection tool can be a set of human defined rules running locally in an online business, a machine learning model trained on past fraud behaviors, or an online scoring service that is called by the online business to detect fraud.

In either case predetermined fraud detection rules or models can be applied by a fraud detection mechanism to identify fraudulent behavior patterns. If, based on the fraud detection rules and/or the fraud detection model(s), a user account is classified as a fraudulent user account, this account typically gets blocked. That is to say, no data transactions can be performed via the fraudulent account, the service is blocked for the fraudulent user account. Fraudsters can analyze potential fraud detection strategies employed by the detection tool and come up with strategies to bypass the rules or models underlying the fraud detection tools. For example, they can quickly set up new and/or modify accounts with a different combination of fake account or user data until they find a new combination that does not (yet) get classified as fraudulent account. When fraud scoring shows a repetitive blocking behavior a fraudster might discover the exact behavior (the set of rules) that causes his account(s) to be blocked. This knowledge might help to circumvent a potential high fraud score and prevent a potential ban of the account. Since the business replies in real-time it may be possible for the fraudster to understand the behavior very quickly by trying many different attack permutations.

The present disclosure addresses this issue and describes how to make it more difficult for a fraudster to extract the behavior of a fraud detection tool.

FIG. 1 shows a schematic flowchart of a method 100 of fraud handling in accordance with an embodiment of the present disclosure.

The method 100 is illustrated from a service provider's perspective. Method 100 includes an act 110 of receiving a data transaction request from or via at least one user account via a data network. Next, the received data transaction request gets analyzed (act 120) based on fraud detection rules and/or models to generate a fraud score associated with the at least one user account. If the associated fraud score exceeds a certain fraud likelihood threshold, the at least one user account is classified (act 130) as fraudulent account. Then, according to an embodiment of the present disclosure, data transactions associated with a classified fraudulent account are not always blocked but unrestrictedly permitted, restrictedly permitted (e.g., with some deterioration), or completely blocked in a pseudo-random fashion (act 140). This pseudo-random permission/blocking behavior appears unpredictable to the fraudster and makes it harder for him to analyze and hence to circumvent the underlying fraud detection rules/models.

In some embodiments, the data network can be the Internet. However, the skilled person having benefit from the present disclosure will appreciate that also any other public or private data networks are conceivable. The data transaction request can be an online payment request including credit card or other bank account information of a user, for example. User data of the data transaction request can be analyzed using a set of predefined fraud detection rules (e.g., statistical techniques) or based on one or more intelligent fraud detection machine learning models (artificial intelligence). Thus, the act of analyzing 120 the data transaction request can comprise feeding the data transaction request from the at least one user account into a machine learning model which is configured to recognize fraudulent data transactions.

The fraud score generated by the fraud detection scheme can indicate a low, medium, or high probability of fraudulent usage, for example. Conventionally, user accounts having a low fraud score do not get blocked, while at least user accounts with high fraud scores do get blocked. That is to say, conventionally there is a direct relation between fraud score and account blocking (e.g., a high fraud score leads to a blocked user account). The present disclosure proposes to intentionally not block all identified or classified fraudster accounts to obfuscate the real behavior of the fraud detection tool. That is, even user accounts with high or very high fraud scores do not necessarily get blocked. Instead, the blocking (or permission) is performed pseudo-randomly. In some embodiments, pseudo-randomly unrestrictedly permitting, restrictedly permitting or blocking the data transactions comprises generating a pseudo-random permission-restriction-sequence based on a predefined pseudo-random seed to initialize a pseudorandom number generator. If one thinks of this pseudo-random permission-blocking-sequence as a binary sequence of "0" and "1", "0" could mean "block" while "1" could mean "permit". Thus, if a user account with a high fraud score is pseudo-randomly associated with a "1", the user account may not get blocked and thus the fraudster may not realize that the fraud detection tool has classified his account as fraudulent.

However, the skilled person having benefit form the present disclosure will appreciate that the pseudo-random permission of fraudulent user accounts however takes in an acceptable loss rate from the service provider or business and uses a pseudo-random selection algorithm to cause frustration to the fraudster by allowing some bad behavior. Here, the contention is that if fraudsters cannot achieve a positive return on invest (ROI) they will be forced to stop attacks against the business. We contend that a low loss rate is acceptable in the longer term.

Note that classified fraudulent accounts and/or data transaction that are intentionally not blocked can still be flagged as fraudulent. In some embodiments, the unblocked fraudulent accounts can be offered a tempered/deteriorated version of the service or good (e.g., "service unavailable", "tempered game environment" which does not allow a puzzle, challenge, etc. to succeed, etc.). Thus, in some embodiments the act 140 of pseudo-randomly permitting or blocking the data transactions additionally comprises purposely deteriorating data transactions associated with a classified fraudulent account in comparison to data transactions associated with a classified non-fraudulent account. That is, permitted ones of the data transactions associated with a classified fraudulent account can be purposely deteriorated. Deteriorating the data transactions can comprise at least one of purposely using a higher latency for data communication, purposely sending more unreliable responses, pretending service unavailability, or purposely communicating deteriorated data content. Many other service deteriorations are conceivable. In one example, different types of deterioration may be used for a first permitted data transaction and a second permitted data transaction. This service deterioration without being able to identify the reason can cause massive frustration to the fraudster.

Figure 2:
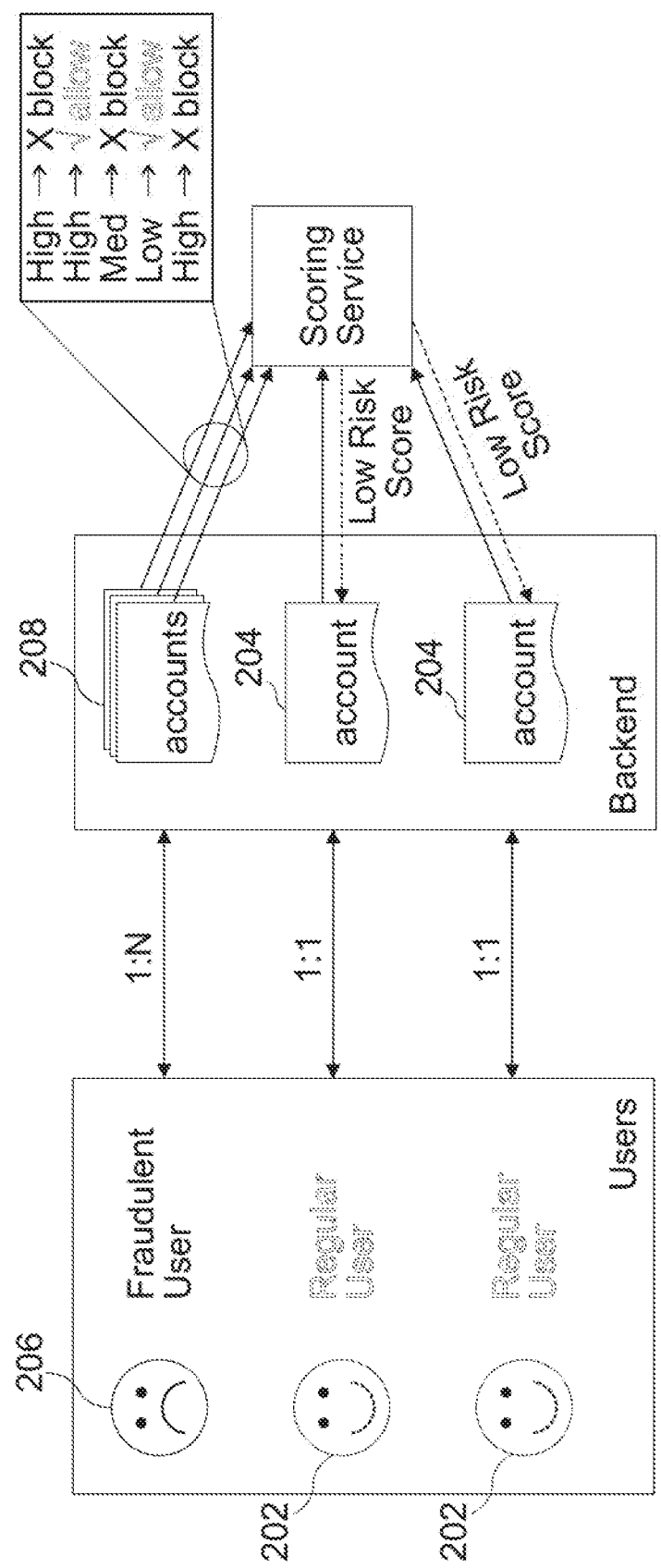
FIG. 2 illustrates a concept of pseudo-random blocking/allowing of fraudulent user accounts.

FIG. 2 illustrates an example scenario how embodiments of the present disclosure may be employed.

User accounts are grouped per user. Normal or regular users 202 map most of the time 1 to 1 with a respective user account 204 in the system. A normal user account 204 typically receives a low fraud score. A fraudulent user 206 often maps to N user accounts or a group of user accounts 208 which will exhibit substantially the same fraudulent behavior. These fraudulent accounts 208 can receive fraud scores ranging from low, medium to high depending on the activity on each account. As these accounts 208 can be linked to the fraudster 206 based on a fraud detection scheme using rules or artificial intelligence, the action taken based on the fraud score can be randomized. User accounts with low, medium, and high fraud scores can be blocked or allowed depending on a provided pseudo-random seed. Using such a pseudo-random seed allows predictable tracking for the service provider of the actions that were allowed to pass through. However, the reason for the blocking will be unrecoverable by the fraudster making it harder or even impossible to find out the employed fraud detection patterns. This increases the chance that fraudsters will give up.

Figure 3:
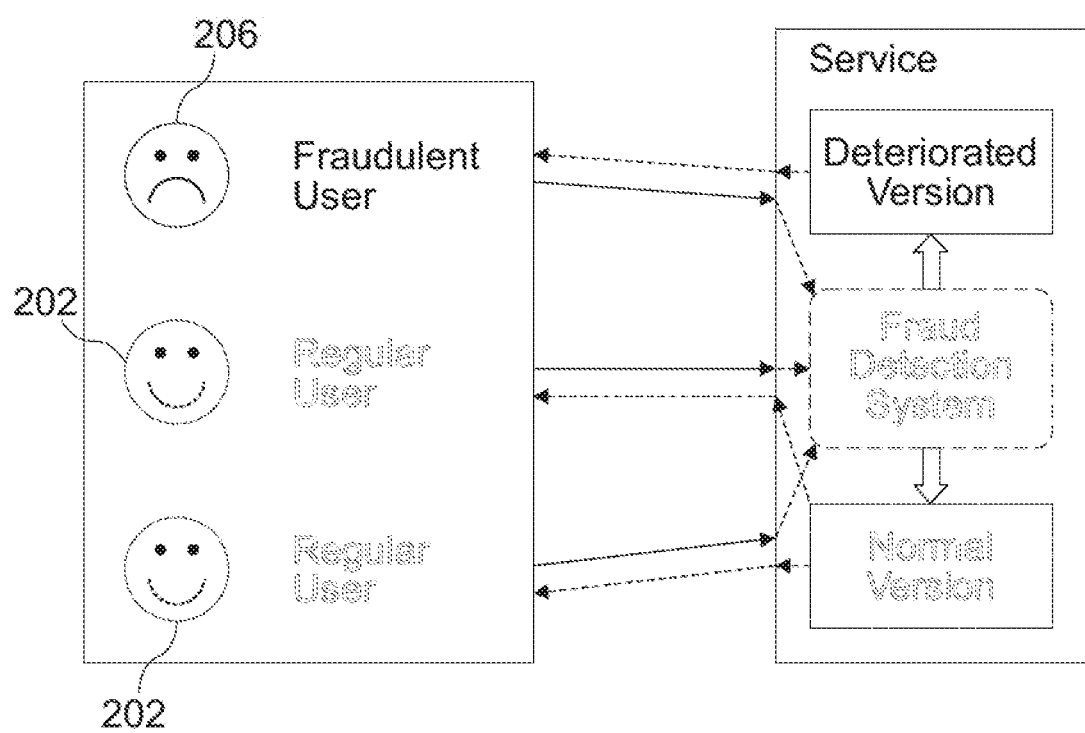
FIG. 3 illustrates a concept of service deterioration for fraudulent user accounts.

Another embodiment of fraud handling is illustrated in FIG. 3.

Alternatively or additionally, some embodiments offer a deteriorated version of the service or product that is being accessed or consumed with this fraudulent account. That means that non-fraudulent user accounts may be served normally, while permitted fraudulent user accounts are served in a purposely deteriorated fashion. The deterioration can be of any/many types, anything that the user experience diminishes or breaks. For example: slow/inconsistent response times, not being able to load parts of content, an alternative version of the content which contains issues, missing features, etc. The concept of FIG. 3 can be used in conjunction with pseudo-randomly permitting or blocking an account when it is being scored/categorised as fraudulent.

The knowingly allowed fraudulent accounts can still be served with deteriorated operations. Examples of deteriorated operations are high latency, unreliable responses, service unavailability, offering an altered version of content (video content with glitches, unsolvable/crashing games, irritating noise added to music, apps blocking randomly, etc.).

By offering a deteriorated version of the service or product damage done by permitted fraudulent accounts can be further reduced. This makes it more difficult for the fraudster to detect its account has been identified as being fraudulent. Thus, the fraudster might still continue with its original intend of misusing this account. But he will not be successful as the deterioration can prevent or alter the successful use of the services, consumables (e.g. altered version of content), etc.

An important consideration to be made is that the amount of fraudulent behavior allowed should be balanced so that it has a positive influence on the return on investment of the service owner and a negative for the attacker.

The attacker will have a cost for:
 setting up a new fraud operation
 figuring out what fraud works and what fraud not
The service owner will have a cost for:
 allowing a percentage of fraudulent traffic
 adapting to a new fraud pattern
This cost function can be supplied by the business.

Embodiments of the present disclosure can bring discredit to the fraudster's reputation if the fraudster does not notice the failing behavior of the service and continues with its original bad intentions. If the original intent was to sell this account to another user this other user will suffer from the same deteriorated version. Or if the intention is to provide the account to another (group of) fraudster(s) the account might proof to be unusable for them as well.

Figure 4:
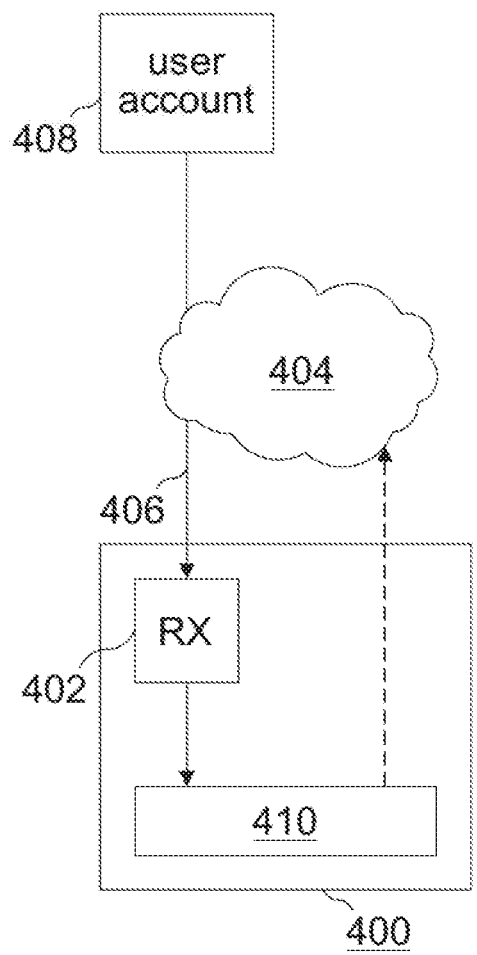
FIG. 4 shows a block diagram of an apparatus for fraud detection according to an embodiment of the present disclosure.

The skilled person having benefit from the present disclosure will appreciate that the described methods can be computer-implemented. An apparatus 400 for fraud handling is schematically illustrated in FIG. 4.

The apparatus 400 comprises a receiver 402 configured to receive, via a data network 404, a data transaction request 406 from at least one user account 408. A processor circuit 410 of the apparatus 400 is configured to analyze the received data transaction request 406 based on predefined fraud detection rules in order to generate a fraud score associated with the at least one user account. The processor circuit 410 is further configured to classify the at least one user account as fraudulent account if the associated fraud score exceeds a predefined fraud likelihood threshold and to pseudo-randomly permit or restrict data transactions associated with a classified fraudulent account via the data network. The processor circuit 410 can be configured to generate a pseudo-random permission-blocking-sequence based on a predefined pseudo-random seed.

Additionally to pseudo-randomly permitting or blocking data transactions, the processor circuit 410 can be configured to permit the data transactions, but to purposely deteriorate the permitted data transactions associated with a classified fraudulent account compared to data transactions associated with a classified non-fraudulent account.

The following examples pertain to further embodiments.

(1) A method of fraud handling, comprising
 receiving, via a data network, a data transaction request from at least one user account;
 analyzing the data transaction request based on predefined fraud detection rules to generate a fraud score associated with the at least one user account;
 classifying the at least one user account as fraudulent account if the associated fraud score exceeds a predefined fraud likelihood threshold; and
 pseudo-randomly permitting or blocking data transactions associated with a classified fraudulent account via the data network.

(2) The method of (1), wherein pseudo-randomly permitting or blocking the data transactions comprises generating a pseudo-random permission-blocking-sequence based on a predefined pseudo-random seed.

(3) The method of any one of (1) or (2), wherein pseudo-randomly permitting or blocking the data transactions comprises purposely deteriorating permitted data transactions associated with a classified fraudulent account with respect to data transactions associated with a classified non-fraudulent account.

(4) The method of (3), wherein deteriorating the data transactions comprises at least one of purposely using a higher latency for data communication, purposely sending more unreliable responses, pretending service unavailability, or purposely communicating deteriorated data content.

(5) The method of any one of (1) to (4), wherein analyzing the data transaction request comprises feeding the data transaction request from the at least one user account into a machine learning model configured to recognize fraudulent data transactions.

(6) The method of any one of (1) to (5), wherein pseudo-randomly permitting or restricting data transactions comprises reacting in real-time to incoming data transaction requests.

(7) An apparatus for fraud handling, comprising
a receiver configured to receive, via a data network, a data transaction request from at least one user account;
a processor circuit configured to analyze the data transaction request based on predefined fraud detection rules to generate a fraud score associated with the at least one user account;
classify the at least one user account as fraudulent account if the associated fraud score exceeds a predefined fraud likelihood threshold; and
pseudo-randomly permit or block data transactions associated with a classified fraudulent account via the data network.

(8) The apparatus of (7), wherein the processor circuit is configured to generate a pseudo-random permission-blocking-sequence based on a predefined pseudo-random seed.

(9) The apparatus of (7) or (8), wherein the processor circuit is configured to purposely deteriorate permitted data transactions associated with a classified fraudulent account compared to data transactions associated with a classified non-fraudulent account.

(10) The apparatus of any one of (7) to (9), wherein the processor circuit is configured to analyze the data transaction request, classify the at least one user account, and pseudo-randomly permit or restrict the data transactions in real-time.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:
1. A method of fraud handling, the method comprising:
training a machine learning model based on past fraud behaviors;
configuring the trained machine learning model to recognize fraudulent data transactions;

receiving, via a data network, a data transaction request from at least one user account;

analyzing the data transaction request based on predefined fraud detection rules to generate a fraud score associated with the at least one user account, wherein analyzing the data transaction request includes feeding the data transaction request from the at least one user account into the trained machine learning model configured to recognize fraudulent data transactions;

classifying the at least one user account as a fraudulent account in response to the associated fraud score exceeding a predefined fraud likelihood threshold;

pseudo-randomly permitting or blocking data transactions associated with the classified fraudulent account via the data network, wherein a pseudo-randomly permitted data transaction is a data transaction that is permitted instead of blocked even though the data transaction is associated with the classified fraudulent account, wherein pseudo-randomly permitting or blocking data transactions is configured to intentionally obfuscate behavior of the fraud handling; and deteriorating the permitted data transaction associated with the classified fraudulent account with respect to data transactions associated with a classified non-fraudulent account, wherein deteriorating the permitted data transactions comprises at least one of purposely using a higher latency for data communication or communicating altered data content.

2. The method of claim 1, wherein pseudo-randomly permitting or blocking the data transactions comprises generating a pseudo-random permission-restriction-sequence based on a predefined pseudo-random seed.

3. The method of claim 1, wherein deteriorating the permitted data transactions comprises at least one of pretending service unavailability and providing a game environment which does not allow a puzzle to succeed.

4. The method of claim 1, wherein pseudo-randomly permitting or restricting data transactions comprises reacting in real-time to incoming data transaction requests.

5. An apparatus for fraud handling, the apparatus comprising: a receiver configured to receive, via a data network, a data transaction request from at least one user account; a processor circuit configured to train a machine learning model based on past fraud behaviors, configure the trained machine learning model to recognize fraudulent data transactions, analyze the data transaction request based on predefined fraud detection rules to generate a fraud score associated with the at least one user account, wherein the processor circuit for analyzing the data transaction request is further configured to feed the data transaction request from the at least one user account into the trained machine learning model configured to recognize fraudulent data transactions; classify the at least one user account as a fraudulent account in response to the associated fraud score exceeding a predefined fraud likelihood threshold; pseudo-randomly permit or block data transactions associated with the classified fraudulent account via the data network, wherein a pseudo-randomly permitted data transaction is a data transaction that is permitted instead of blocked even though the data transaction is associated with the classified fraudulent account, wherein pseudo-randomly permitting or blocking data transactions is configured to intentionally obfuscate behavior of the fraud handling; and deteriorate the permitted data transaction associated with the classified fraudulent account with respect to data transactions associated with a classified non-fraudulent account, wherein deteriorating the permitted data transactions comprises at least one of purposely using a higher latency for data communication or communicating altered data content.

6. The apparatus of claim 5, wherein the processor circuit is configured to generate a pseudo-random permission-blocking-sequence based on a predefined pseudo-random seed.

7. The apparatus of claim 5, wherein the processor circuit is configured to analyze the data transaction request, classify the at least one user account, and pseudo-randomly permit or restrict the data transactions in real-time.

* * * * *